(12) United States Patent
Torii et al.

(10) Patent No.: US 6,707,188 B2
(45) Date of Patent: Mar. 16, 2004

(54) MOTOR HAVING ROTATIONAL SENSOR

(75) Inventors: Katsuhiko Torii, Hamamatsu (JP); Kengo Yamamura, Inasa-gun (JP); Hiroaki Yamamoto, Kosai (JP); Naoki Imamura, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 274 days.

(21) Appl. No.: 09/838,171

(22) Filed: Apr. 20, 2001

(65) Prior Publication Data

US 2002/0047347 A1 Apr. 25, 2002

(30) Foreign Application Priority Data

May 8, 2000 (JP) .......................... 2000-134938

(51) Int. Cl.$^7$ .................. H02K 11/00; H02K 7/10
(52) U.S. Cl. .................. 310/75 R; 310/96; 310/98; 310/100
(58) Field of Search .................. 310/68 B, 75 R, 310/96, 99, 98, 100, 78

(56) References Cited

U.S. PATENT DOCUMENTS

| | | | | |
|---|---|---|---|---|
| 1,945,361 A | * | 1/1934 | Ball | 475/149 |
| 3,050,321 A | * | 8/1962 | Howe et al. | 403/1 |
| 3,177,998 A | * | 4/1965 | Rossez | 192/84.95 |
| 3,269,204 A | * | 8/1966 | Schleicher, Jr. | 74/424.5 |
| 3,301,081 A | * | 1/1967 | Kern, Jr. | 74/421 A |
| 3,559,499 A | | 2/1971 | Profet | |
| 3,761,749 A | * | 9/1973 | Marti | 310/78 |
| 3,873,066 A | | 3/1975 | Opyrchal | |
| 4,227,104 A | * | 10/1980 | Hamman | 310/75 R |
| 4,398,135 A | * | 8/1983 | Busch et al. | 318/443 |
| 4,572,979 A | * | 2/1986 | Haar et al. | 310/68 R |
| 4,574,928 A | * | 3/1986 | Norton | 192/48.92 |
| 4,652,781 A | * | 3/1987 | Andrei-Alexandru et al. | 310/83 |
| 4,713,568 A | * | 12/1987 | Adam et al. | 310/112 |
| 4,877,113 A | * | 10/1989 | Taig | 188/82.84 |
| 4,940,936 A | * | 7/1990 | Grillo et al. | 324/174 |
| 4,987,963 A | * | 1/1991 | Oslapas et al. | 180/445 |
| 5,005,906 A | * | 4/1991 | Suzuki et al. | 297/362 |
| 5,015,897 A | * | 5/1991 | Inagaki et al. | 310/83 |
| 5,041,751 A | * | 8/1991 | Yokozuka | 310/239 |
| 5,066,878 A | * | 11/1991 | Sekine et al. | 310/68 C |
| 5,111,098 A | * | 5/1992 | Peck et al. | 310/156.64 |
| 5,248,009 A | * | 9/1993 | Takehara et al. | 180/445 |
| 5,299,649 A | * | 4/1994 | Sano et al. | 180/400 |
| 5,373,206 A | * | 12/1994 | Lim | 310/68 B |
| 5,497,672 A | * | 3/1996 | Appleford et al. | 74/89.29 |
| 5,528,093 A | * | 6/1996 | Adam et al. | 310/89 |
| 5,564,231 A | * | 10/1996 | Tajima et al. | 49/352 |
| 5,710,474 A | * | 1/1998 | Mulgrave | 310/254 |
| 5,716,279 A | * | 2/1998 | Ham et al. | 464/159 |
| 5,819,583 A | * | 10/1998 | Matsushima et al. | 74/7 E |
| 5,844,382 A | * | 12/1998 | Dan | 318/10 |
| 5,864,303 A | * | 1/1999 | Rosen et al. | 340/870.37 |
| 5,907,885 A | * | 6/1999 | Tilli et al. | 15/250.15 |
| 5,979,255 A | * | 11/1999 | Huang et al. | 74/84 R |
| 5,998,899 A | * | 12/1999 | Rosen et al. | 310/90.5 |
| 6,000,491 A | * | 12/1999 | Shimizu et al. | 180/444 |
| 6,003,193 A | * | 12/1999 | Rivin et al. | 15/250.3 |
| 6,201,326 B1 | * | 3/2001 | Klappenbach et al. | 310/239 |
| 6,242,824 B1 | * | 6/2001 | Torii et al. | 310/42 |
| 6,288,464 B1 | * | 9/2001 | Torii et al. | 310/78 |
| 2002/0047460 A1 | * | 4/2002 | Yoneda et al. | 310/216 |

* cited by examiner

Primary Examiner—Burton S Mullins
Assistant Examiner—H. Elkassabgi
(74) Attorney, Agent, or Firm—Posz & Bethards, PLC

(57) ABSTRACT

A rotational sensor of a motor includes a sensor magnet and a sensing element. The sensor magnet is secured to a driving-side rotator of a clutch, which is connected to a rotatable shaft of the motor, to rotate integrally therewith. The sensing element measures a rotational speed of the sensor magnet. Furthermore, the sensing element is secured to a motor case in such a manner that the sensing element opposes the sensor magnet.

21 Claims, 7 Drawing Sheets

MOTOR HAVING ROTATIONAL SENSOR

CROSS REFERENCE TO RELATED APPLICATION

This application is based on and incorporates herein by reference Japanese Patent Application No. 2000-134938 filed on May 5, 2000 and Japanese Patent Application No. 2001-73578 filed on Mar. 15, 2001.

BACKGROUND OF THE INVENTION

1. Field of the Invention

The present invention relates to a motor, and more particularly to a motor having a rotational sensor for measuring a rotational speed of a rotor thereof and also having a worm shaft that is connected to a rotatable shaft of the rotor through a coupling member, such as a clutch.

2. Description of Related Art

One type of motor for actuating a power window system, an electrically actuated sunroof system or the like includes a rotational sensor for measuring a rotational speed of a rotor of the motor. The rotational sensor includes a sensor magnet and a sensing element (Hall IC). The sensor magnet is secured around a rotatable shaft of the rotor in such a manner that the sensor magnet is accommodated in an unoccupied space within a motor case of the motor where an armature, a commutator, a bearing for rotatably supporting the rotatable shaft or the like is not located. The sensing element is secured to the motor case in such a manner that the sensing element faces the sensor magnet and outputs a pulse signal indicative of a rotational speed of the sensor magnet that rotates integrally with the rotor to an external control device.

In a case of the power window system, during upward movement of a vehicle window, if an obstruction (such as a human body) is clamped between, for example, the vehicle window and its window frame, a rotational speed of the rotor of the motor that drives the vehicle window changes. Based on the change in the rotational speed of the rotor, electric current supplied from the control device to the motor is stopped or reversed to stop or reverse the travel of the window.

The above-described type of motor further includes a speed reducing arrangement. The speed reducing arrangement includes a worm shaft coupled with the rotatable shaft and also has a worm wheel meshed with a worm of the worm shaft. Furthermore, this type of motor includes a coupling member, such as a clutch, that transmits rotation of the rotatable shaft to the worm shaft and prevents transmission of rotation of the worm shaft to the rotatable shaft.

In this motor, the motor case includes a generally cup-shaped yoke and a housing that is secured to an open end of the yoke. The yoke is made of a metal material and receives the rotatable shaft. The housing of the motor is made of a resin material and receives the worm shaft. The sensing element is preferably secured to a resin component that is arranged at a connection between the yoke and the housing for ease of installation. Thus, the sensor magnet that opposes the sensing element is accordingly placed at the connection between the yoke and the housing, i.e., at the connection (coupling member, such as the clutch) between the rotatable shaft and the worm shaft.

However, when the sensor magnet is secured around the rotatable shaft near the coupling member, such as the clutch, the rotatable shaft must have an extra length to accommodate the sensor magnet therearound. This causes an increase in the axial length of the motor, resulting in an increase in the size of the motor.

SUMMARY OF THE INVENTION

The present invention addresses the above disadvantages. Thus, it is an objective of the present invention to provide a motor that has a reduced size and includes a rotational sensor and a coupling member, such as a clutch, for coupling a rotatable shaft of a rotor with a worm shaft.

To achieve the objective of the present invention, there is provided a motor including a motor case, a rotatable shaft, a worm shaft, a coupling member and a rotational sensor. The rotatable shaft is rotatably supported by the motor case and is rotated upon actuation of the motor. The worm shaft is substantially coaxial with the rotatable shaft and is rotatably supported by the motor case. The coupling member includes a driving-side rotator and a driven-side rotator that is drivingly engageable with the driving-side rotator. The driving-side rotator is connected to the rotatable shaft to rotate integrally therewith. The driven-side rotator is connected to the worm shaft to rotate integrally therewith. The rotational sensor includes a sensor magnet and a sensing element. The sensor magnet rotates integrally with the rotatable shaft. The sensing element measures a rotational speed of the sensor magnet. The sensor magnet is secured to the driving-side rotator to rotate integrally therewith. The sensing element is secured to the motor case in such a manner that the sensing element opposes the sensor magnet.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A motor of a power window system according to one embodiment of the present invention will be described with reference to FIGS. 1–8. The motor 1 includes a motor main body 2, a speed reducing arrangement 3, a rotational sensor S (FIG. 5) and a clutch C as a coupling member.

Figure 1:
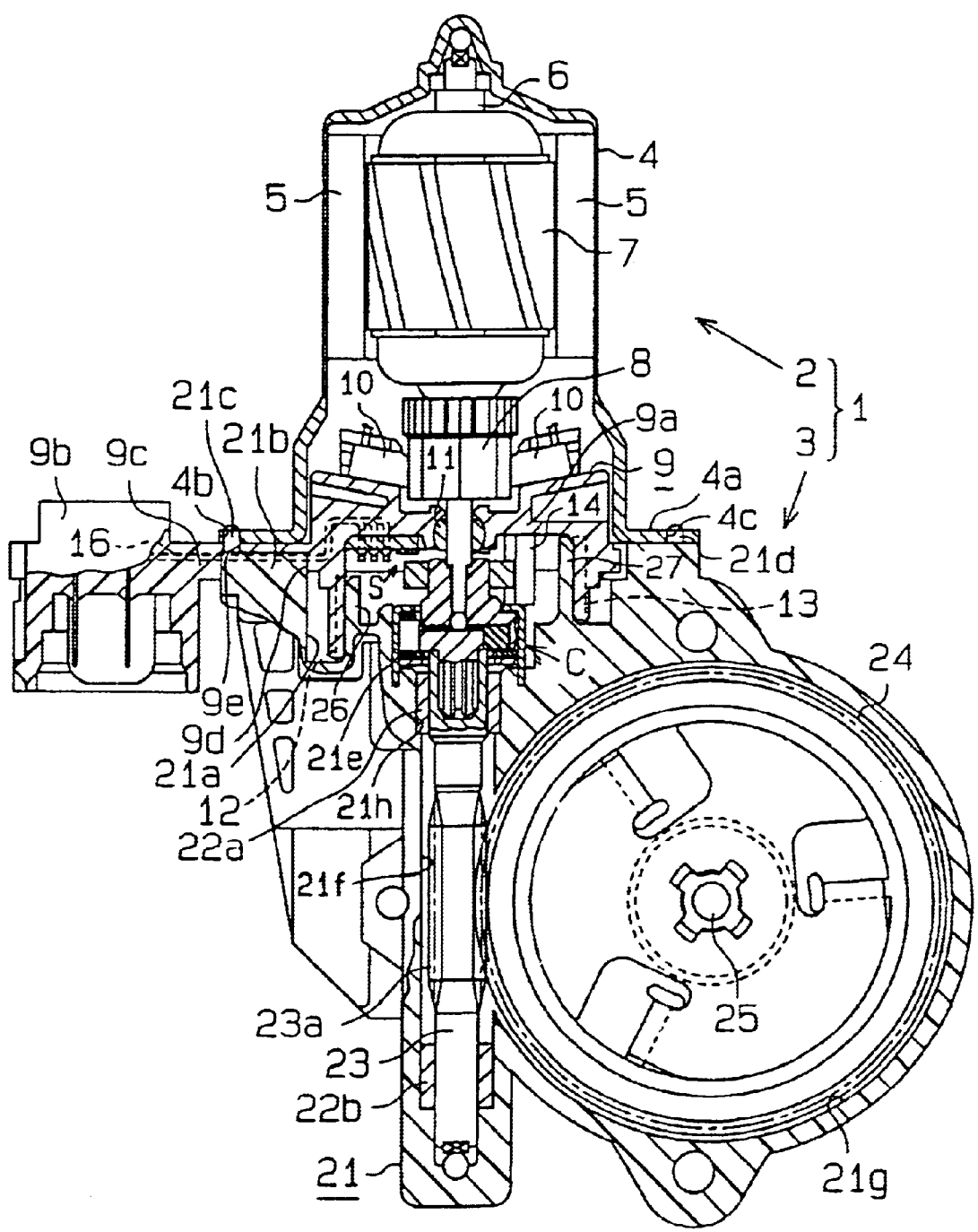
FIG. 1 is a schematic cross-sectional view of a motor according to an embodiment of the present invention.
Figure 2:
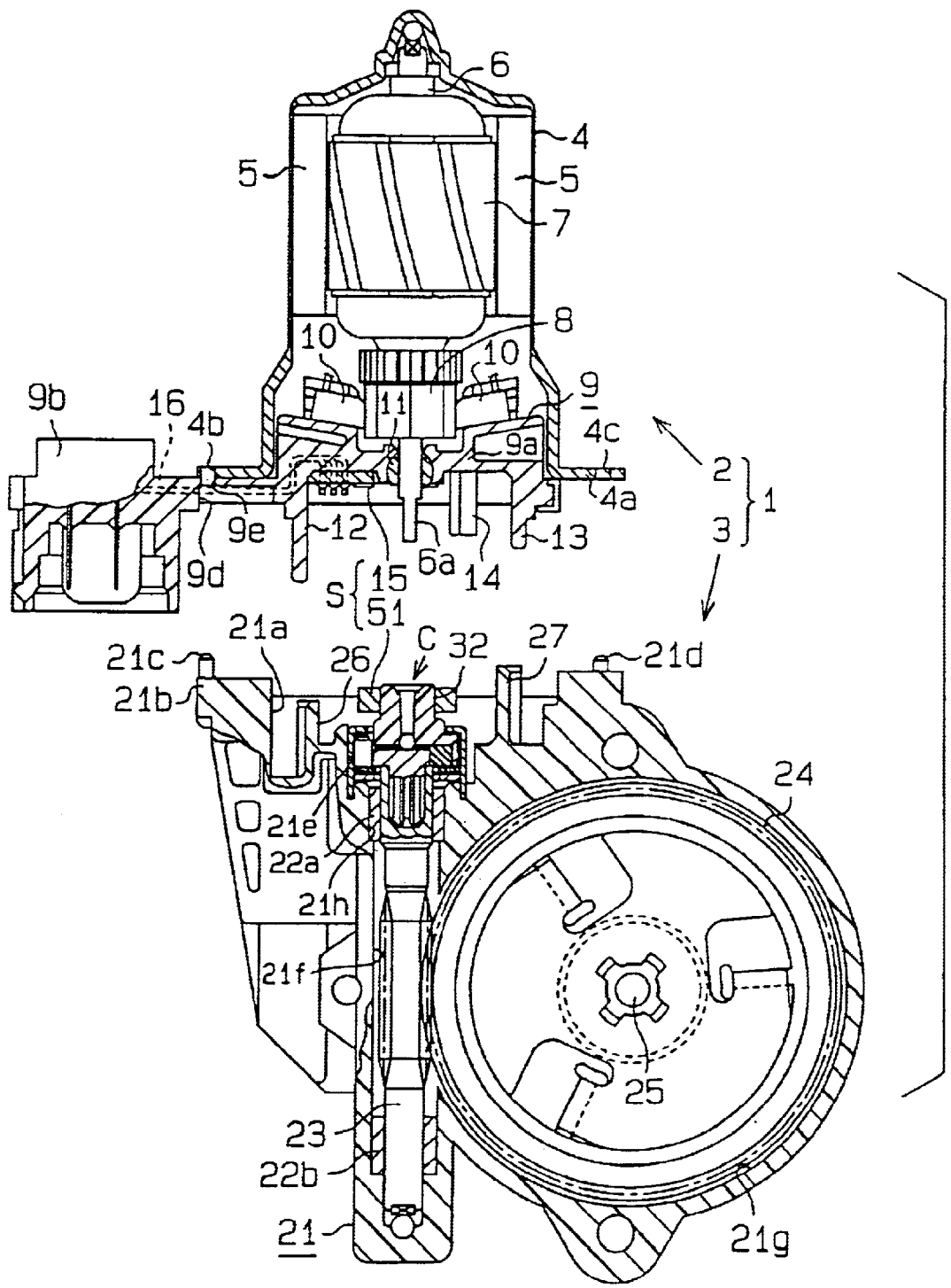
FIG. 2 is an exploded schematic cross-sectional view of the motor according to the embodiment.

As shown in FIGS. 1 and 2, the motor main body 2 includes a yoke housing (hereinafter simply referred as the yoke) 4, magnets 5, a rotatable shaft 6, an armature 7, a commutator 8, a resin brush holder 9 and power supplying brushes 10.

Figure 5:
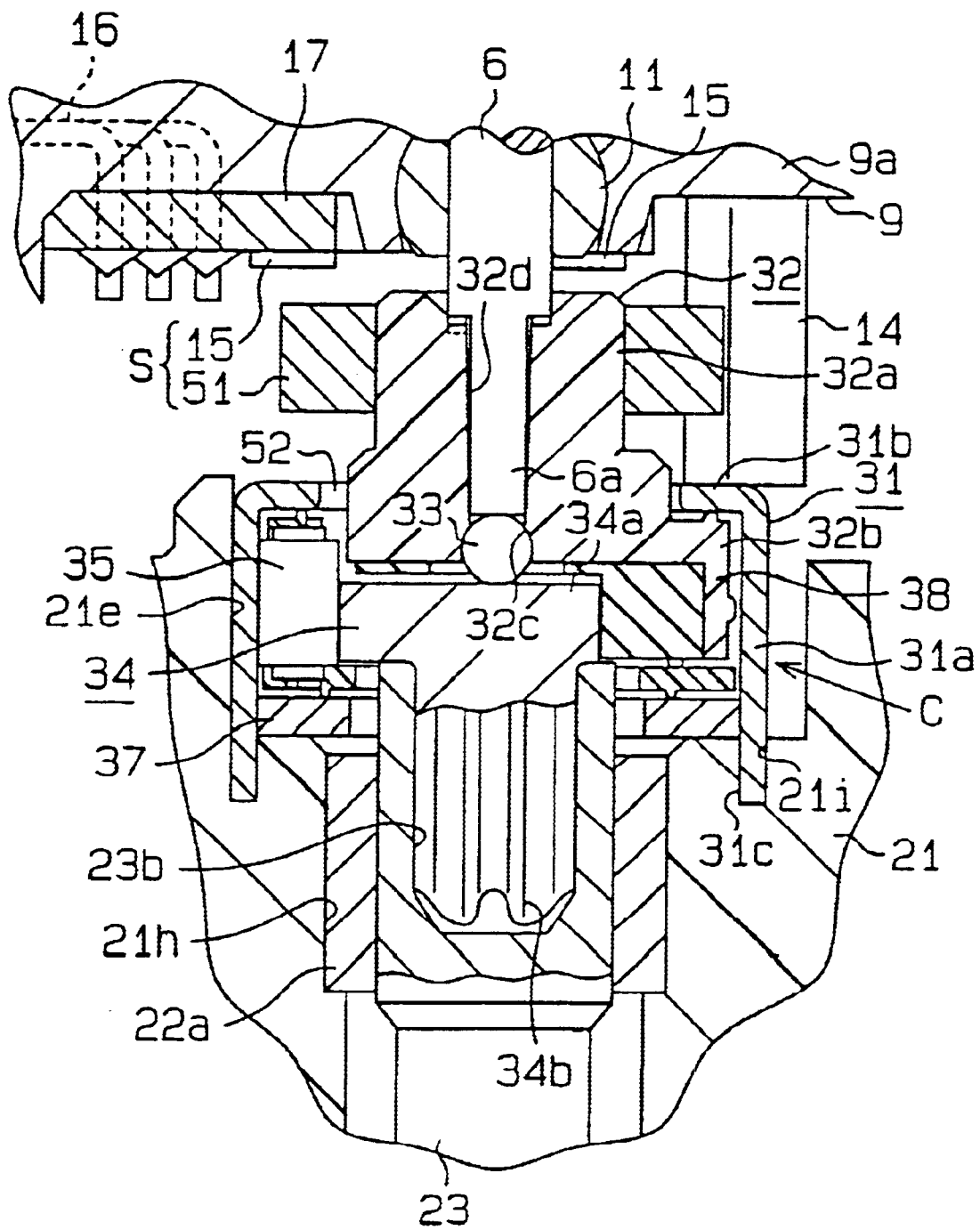
FIG. 5 is a partial enlarged cross-sectional view showing the clutch and a rotational sensor according to the embodiment.

The yoke 4 is generally cup-shaped. The two magnets 5 are secured to an inner peripheral surface of the yoke 4 in such a manner that the magnets 5 diametrically oppose each other. A base end (top side in FIG. 1 or 2) of the rotatable shaft 6 is rotatably supported at a base of the yoke 4. As shown in FIG. 5, an annular protrusion 6a having diametrically opposing flat outer surfaces is formed at a distal end of the rotatable shaft 6.

The armature 7 is secured around a middle part of the rotatable shaft 6 in such a manner that the armature 7 radially opposes the magnets 5. The commutator 8 is secured around the rotatable shaft 6 at a position distal to the armature 7.

Figure 3:
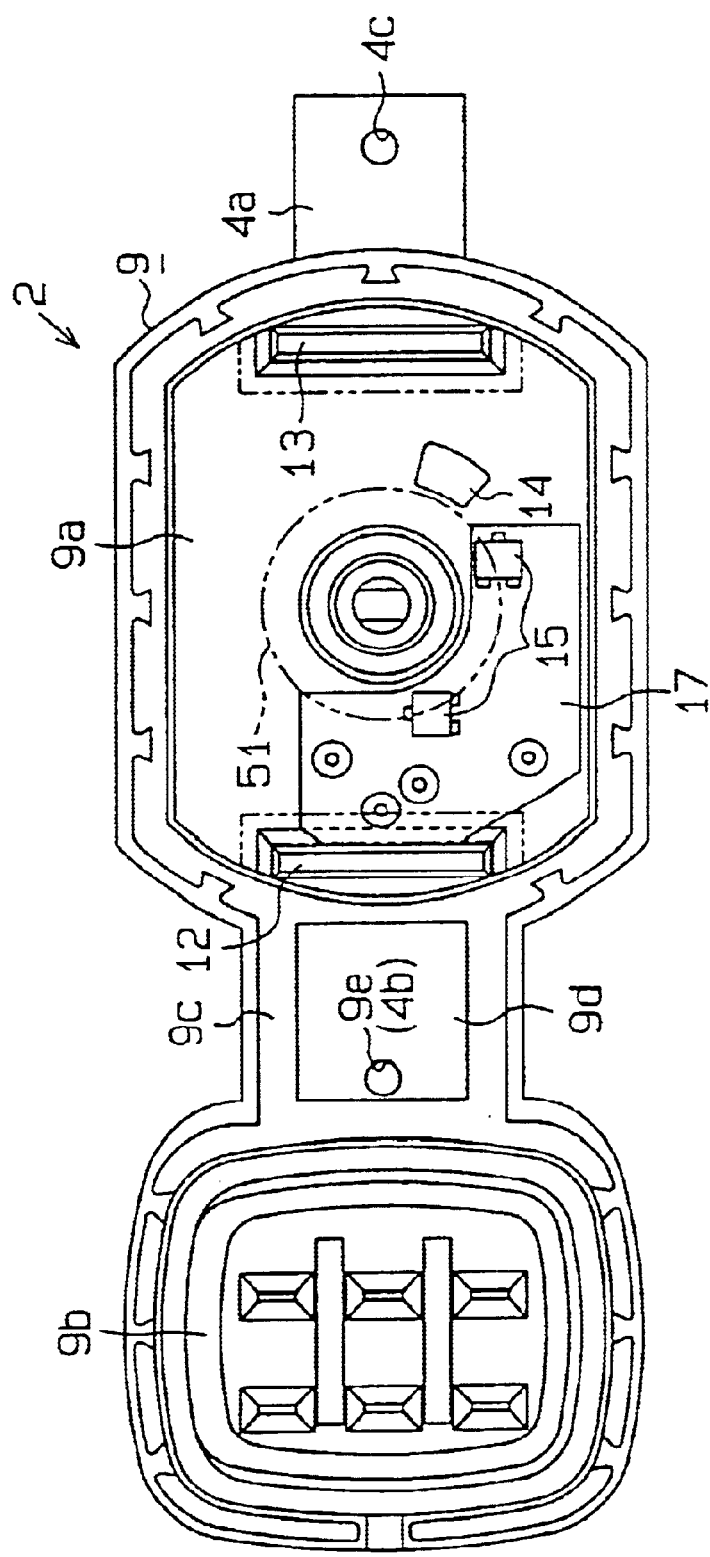
FIG. 3 is an end view of a motor main body of the motor according to the embodiment.

A flange 4a extends radially outwardly from an open end of the yoke 4 and has first and second through holes 4b and 4c that axially penetrate through the flange 4a. The brush holder 9 is received in and secured to the open end of the yoke 4. With reference to FIG. 3, the brush holder 9 substantially corresponds to the open end of the yoke 4 and includes a holder main body 9a and a connector 9b. The holder main body 9a is configured to substantially cover the open end of the yoke 4. The connector 9b outwardly protrudes from the flange 4a in a radial direction of the rotatable shaft 6. The two power supplying brushes 10 are held on a first axial side (top side in FIG. 1) of the holder main body 9a which faces an interior of the yoke 4. The brushes 10 are connected to the connector 9b through wiring (not shown). A bearing 11 is arranged at substantially a center of the holder main body 9a to rotatably support a portion of the rotatable shaft 6.

With reference to FIG. 3, in a connecting portion 9c that connects the holder main body 9a of the brush holder 9 to the connector 9b, there is formed a recess 9d that is recessed on the speed reducing arrangement 3 side (bottom side in FIG. 1 or 2) of the connecting portion 9c. Furthermore, in the recess 9d, a through hole 9e axially penetrates through the connecting portion 9c in alignment with the first through hole 4b.

A pair of first engaging projections 12 and 13 are formed on a second axial side (bottom side in FIG. 1 or 2) of the holder main body 9a which is opposite to the first axial side of the holder main body 9a. The first engaging projections 12 and 13 extend parallel to the rotatable shaft 6. A protrusion 14 that extends in the same direction as the first engaging projections 12 and 13 is formed in the holder main body 9a on the second side thereof near the center of the holder main body 9a.

Furthermore, as shown in FIGS. 3 and 5, Hall ICs 15 that act as sensing elements constituting the rotational sensor S are secured to the second side of the holder main body 9a. Specifically, wiring 16 is embedded in the brush holder 9 to extend from the connector 9b to the second side of the holder main body 9a. Furthermore, on the second side of the holder main body 9a, there is secured a circuit board 17 having undepicted conductive patterns that are connected to an exposed part of the wiring 16. The Hall ICs 15 are secured to the circuit board 17. In the present embodiment, the two Hall ICs 15 are arranged around the bearing 11 at a predetermined angular interval.

The brushes 10 are arranged to oppose and to contact the commutator 8. With this arrangement, when electric current is supplied to a coil wound around the armature 7 through the brushes 10 and the commutator 8 from an undepicted control device (external power source) connected to the connector 9b, the armature 7 or the rotatable shaft 6 of the motor main body 2 is rotated.

With reference to FIGS. 1 and 2, the speed reducing arrangement 3 includes a gear housing 21, first and second bearings 22a, 22b, a worm shaft 23, a worm wheel 24 and an output shaft 25. The gear housing 21 is made of a resin material and is secured to the open end of the yoke 4 and also to the brush holder 9 at its top end (top side in FIG. 1).

At a center of the top end of the gear housing 21, there is formed an open end recess 21a. A protrusion 21b that is received in the recess 9d of the brush holder 9 is formed at the top end of the gear housing 21. Furthermore, a projection 21c that is fitted into both the through hole 9e of the brush holder 9 and the first through hole 4b of the yoke 4 is formed on the protrusion 21b. Also, in the top end of the gear housing 21, there is formed another projection 21d that is fitted into the second through hole 4c of the yoke 4. The gear housing 21 is secured to both the brush holder 9 and the yoke 4 by the three portions, i.e., the protrusion 21b fitted into the recess 9d of the brush holder 9; the projection 21c fitted into both the through hole 9e of the brush holder 9 and the first through hole 4b of the yoke 4; and the protrusion 21d fitted into the second through hole 4c of the yoke 4.

The gear housing 21 further includes a clutch receiving recess 21e (best seen in FIG. 5), a worm shaft receiving recess 21f and a wheel receiving chamber 21g. The clutch receiving recess 21e is recessed from a base of the open end recess 21a at a center thereof in the axial direction of the rotatable shaft 6. The worm shaft receiving recess 21f is recessed from a base of the clutch receiving recess 21e at a center thereof in the axial direction of the rotatable shaft 6. The wheel receiving chamber 21g is communicated with the worm shaft receiving recess 21f at an axially middle portion of the worm shaft receiving recess 21f. A bearing receiving recess 21h (FIG. 5) is formed at an open end of the worm shaft receiving recess 21f.

Furthermore, at the base of the open end recess 21a of the gear housing 21, a pair of second engaging projections 26 and 27 are provided. Both the second engaging projections 26 and 27 extend parallel to the axial direction of the rotatable shaft 6. Also, each second engaging projection 26 or 27 has a horseshoe-shaped cross section and surrounds the corresponding first engaging projection 12 or 13, as shown with dot-dot-dash lines in FIG. 3.

The first bearing 22a is a substantially cylindrical radial bearing that is secured to an inner peripheral surface of the bearing receiving recess 21h. The second bearing 22b is secured to an inner peripheral surface of a base portion (bottom side in FIG. 1) of the worm shaft receiving recess 21f.

The worm shaft 23 has a worm 23a in the axially middle part thereof. Furthermore, a first end (top side in FIG. 1 or 2) of the worm shaft 23 is rotatably supported by the first bearing 22a, and a second end (bottom side in FIG. 1 or 2) of the worm shaft 23 is rotatably supported by the second bearing 22b. With reference to FIG. 5, in the first end of the worm shaft 23, there is formed an engaging hole 23b having a plurality of engaging tooth along an inner peripheral surface thereof.

With reference to FIGS. 1 and 2, the worm wheel 24 is meshed with the worm 23a and is received within the wheel receiving chamber 21g in such a manner that the worm wheel 24 is allowed to rotate about its rotational axial that extends in a direction (direction perpendicular to the drawing surface in FIG. 1 or 2) perpendicular to the worm shaft 23. The output shaft 25 is connected to the worm wheel 24 in such a manner that the output shaft 25 rotates about the same rotational axis as the worm wheel 24 when the worm wheel 24 is rotated. The output shaft 25 is connected to a known regulator (not shown) in such a manner that forward rotation of the output shaft 25 causes an undepicted vehicle window to be closed (to be moved upward), and backward rotation of the output shaft 25 causes the window to be opened (to be moved downward).

Figure 4:
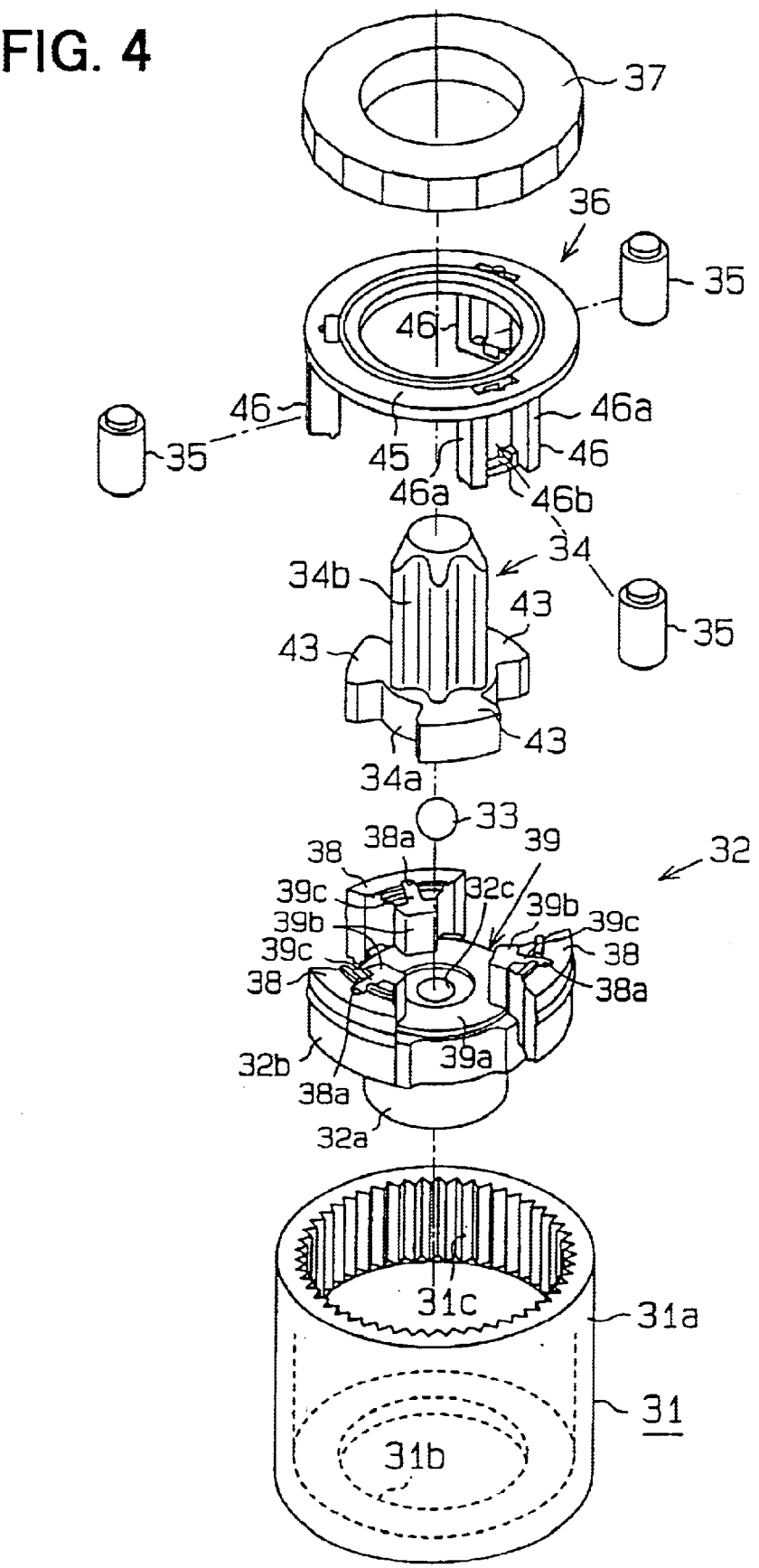
FIG. 4 is an exploded perspective view of a clutch of the motor according to the embodiment.
Figure 6:
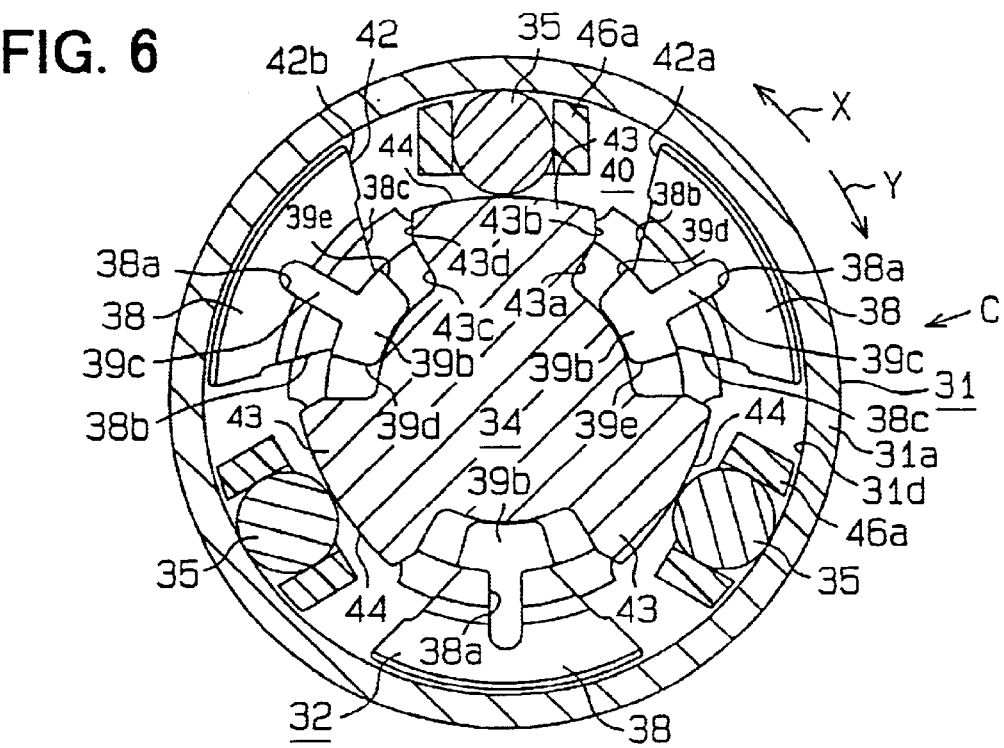
FIG. 6 is a descriptive cross-sectional view of the clutch according to the embodiment, showing a construction of the clutch.

The rotatable shaft 6 is connected to the worm shaft 23 via the clutch C. As shown in FIGS. 4–6, the clutch C includes a clutch housing 31, a driving-side rotator 32, a ball 33, a driven-side rotator 34, a plurality (three) of rolling elements 35, a support member 36 and a cover plate 37. The clutch housing 31 includes a cylindrical outer ring 31a and an annular cover 31b that extends radially inwardly from one end (lower end in FIG. 4) of the cylindrical outer ring 31a. A substantially saw-toothed, serrated portion 31c is formed along an inner peripheral surface of the other end (top side in FIG. 4) of the cylindrical outer ring 31a. The driving-side rotator 32, the ball 33, the driven-side rotator 34, the rolling elements 35, the support member 36 and the cover plate 37 are assembled together and are substantially received within the clutch housing 31 to form one functional unit (clutch C).

As shown in FIG. 5, the serrated portion 31c of the clutch housing 31 is securely engaged with a corresponding annular serrated groove 21i generally centrally arranged in the base of the clutch receiving recess 21e. The cover 31b of the clutch housing 31 is axially pressed by the protrusion 14 of the brush holder 9 such that the clutch housing 31 does not come out of the annular serrated groove 21i.

The driving-side rotator 32 is made of a resin material. Furthermore, the driving-side rotator 32 includes a shaft portion 32a and a disk body 32b that has a larger diameter than the shaft portion 32a. A portion of the shaft portion 32a which radially opposes the cover 31b of the clutch housing 31 has an outer diameter that is slightly smaller than an inner diameter of the cover 31b of the clutch housing 31. The shaft portion 32a of the driving-side rotator 32 extends through an opening of the cover 31b, and a base end side (upper side in FIG. 5) of the disk body 32b is slidably engaged with the cover 31b of the clutch housing 31, so that the driving-side rotator 32 is rotatably supported in the clutch housing 31. A ball receiving recess 32c is formed at a center of the disk body 32b. An annular recess (interfitting recess) 32d is formed in the center of the shaft portion 32a. The annular recess 32d is communicated with the ball receiving recess 32c and has diametrically opposing flat inner surfaces to interfit with the annular protrusion 6a of the rotatable shaft 6 which has the diametrically opposing flat outer surfaces.

Since the annular recess 32d having the diametrically opposing flat inner surfaces receives the annular protrusion 6a having the corresponding diametrically opposing flat outer surfaces of the rotatable shaft 6, the annular recess 32d and the annular protrusion 6a are non-rotatably interfitted each other. Thus, the rotatable shaft 6 of the motor main body 2 rotates integrally with the driving-side rotator 32.

As shown in FIG. 4, a plurality (three in this embodiment) of generally fan-shaped protrusions 38 that extend in the axial direction are arranged at substantially equal angular intervals on the distal end side (bottom side in FIG. 5) of the disk body 32b of the driving-side rotator 32. As shown in FIG. 6, in each protrusion 38, a coupling groove 38a extends halfway from an inner peripheral surface of each protrusion 38 in a radially outward direction.

A cushion member 39 made of a rubber material is securely coupled to the coupling groove 38a of each protrusion 38. More particularly, as shown in FIG. 4, the cushion member 39 includes a relatively thin ring 39a and a plurality (three in this instance) of cushion segments 39b that extend from the ring 39a in the axial direction. Furthermore, the cushion segments 39b are circumferentially arranged along the outer peripheral edge of the ring 39a at substantially equal angular intervals. Each cushion segment 39b has a coupling projection 39c for engaging with the corresponding coupling groove 38a on its outer circumferential side. Each coupling projection 39c of the cushion member 39 is coupled with the corresponding coupling groove 38a, and the ring 39a of the cushion member 39 is arranged on and secured to the disk body 32b.

As shown in FIG. 6, a circumferential width of each cushion segment 39b is slightly longer than a circumferential width of an inner peripheral surface of the corresponding protrusion 38. A plurality (three in this instance) of engaging slots 40 are formed at equal angular intervals. Each engaging slot 40 is defined between one side surface (radially extending surface) 38b or 38c of one protrusion 38 and an opposing side surface (radially extending surface) 38c or 38b of the next protrusion 38 and also between one side surface (radially extending surface) 39d or 39e of one cushion segment 39b and an opposing side surface (radially extending surface) 39e or 39d of the next cushion segment 39b. These engaging slots 40 are communicated with each other at center side. The side surfaces 38b and 38c of the protrusions 38 are slightly bulged in the circumferential direction at their outer circumferential sides to define an opening 42 of each engaging slot 40.

The ball 33 is made of a metal material and is received in the ball receiving recess 32c. While the ball 33 is received in the ball receiving recess 32c, part of the ball 33 protrudes from the ball receiving recess 32c.

The driven-side rotator 34 has a disk body 34a and a coupling body 34b that protrudes from the center of the disk body 34a toward its distal end (bottom side in FIG. 5). As shown in FIG. 5, the coupling body 34b has a plurality of tooth that correspond with the tooth of the engaging hole 23b of the worm shaft 23 and is interfitted within the engaging hole 23b. That is, the driven-side rotator 34 is connected to the worm shaft 23 to integrally rotate therewith.

The disk body 34a abuts the ball 33 at its base side (the top side in FIG. 5) and is surrounded by the protrusions 38 (cushion segments 39b) in a manner that allows rotation of the disk body 34a. Furthermore, since the disk body 34a makes point contact with the ball 33, the disk body 34a can rotate smoothly.

As shown in FIGS. 4 and 6, the disk body 34a has a plurality (three in this instance) of generally fan-shaped engaging projections 43. The engaging projections 43 extend radially outward and are spaced at equal angular intervals. A circumferential width of each engaging protrusion 43 is smaller than that of the corresponding engaging slot 40, and the engaging protrusion 43 is received in the corresponding engaging slot 40.

Figure 7:
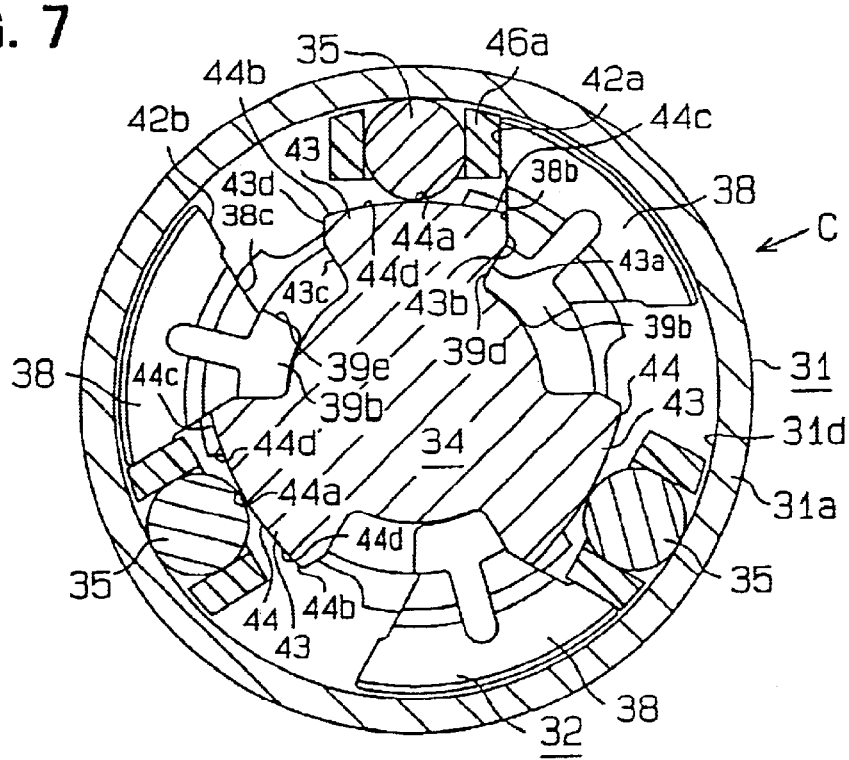
FIG. 7 is another descriptive cross-sectional view of the clutch according to the embodiment, showing one operational state of the clutch.

As shown in FIG. 6, a first cushion surface 43a opposing one side surface (counter-clockwise side surface) 39d of the corresponding cushion segment 39b is formed at a radially inward region of a clockwise side surface of each engaging projection 43. Furthermore, a first engaging surface 43b opposing one side surface (counter-clockwise side surface) 38b of the corresponding protrusion 38 is formed at a radially outward region of the clockwise side surface of the engaging projection 43. The first cushion surface 43a engages the one side surface 39d of the cushion segment 39b when the driving-side rotator 32 is rotated to a predetermined position in the counter-clockwise direction (the direction of an arrow X) relative to the driven-side rotator 34. Furthermore, the first engaging surface 43b engages the one side surface 38b of the protrusion 38 when the driving-side rotator 32 is rotated beyond the predetermined position in the counter-clockwise direction (the direction of the arrow X). Since the cushion segment 39b is deformed in the circumferential direction, the driving-side rotator 32 is allowed to rotate beyond the predetermined position in the counter-clockwise direction (the direction of the arrow X), as shown in FIG. 7.

A second cushion surface 43c opposing the other side surface (clockwise side surface) 39e of the corresponding cushion segment 39b is formed at a radially inward region of an counter-clockwise side surface of each engaging projection 43. Furthermore, a second engaging surface 43d opposing the other side surface (clockwise side surface) 38c of the corresponding protrusion 38 is formed at a radially outward region of the counter-clockwise side surface of the engaging projection 43. The second cushion surface 43c engages the other side surface 39e of the cushion segment 39b when the driving-side rotator 32 is rotated to a predetermined position in the clockwise direction (the direction of an arrow Y) relative to the driven-side rotator 34. Furthermore, the second engaging surface 43d engages the other side surface 38c of the protrusion 38 when the driving-side rotator 32 is rotated beyond the predetermined position in the clockwise direction (the direction of the arrow Y). Since the cushion segment 39b is deformed in the circumferential direction, the driving-side rotator 32 is allowed to rotate beyond the predetermined position in the clockwise direction (the direction of the arrow Y).

A control surface 44 is formed on an outer peripheral surface of each engaging projection 43. In the present embodiment, as shown in FIG. 6, the control surface 44 is entirely arcuately bulged in a radially outward direction beyond a rotational trajectory of a circumferential center portion 44a about the rotational axis of the driven-side rotator 34. A radius of curvature of the arcuately bulged control surface 44 is larger than that of the rotational trajectory. Thus, in the control surface 44, the center portion 44a is located radially outward of a straight line that connects opposing circumferential end portions 44b and 44c of the control surface 44. Furthermore, in the control surface 44, each intermediate portion 44d positioned between the center portion 44a and a respective one of the end portions 44b, 44c is arcuately bulged in a radially outward direction beyond a corresponding straight line that connects the center portion 44a and the corresponding end portion 44b or 44c.

Each rolling element 35 is a generally cylindrical body made of a metal material. The rolling element 35 is circumferentially positioned between a first side surface 42a and a second side surface 42b of the opening 42 and is radially positioned between the control surface 44 of the engaging projection 43 and an inner peripheral surface 31d of the outer ring 31a of the clutch housing 31.

A diameter of the rolling element 35 is smaller than a distance between the center portion 44a of the control surface 44 and the inner peripheral surface 31d of the outer ring 31a but is longer than a distance between each of the end portions 44b, 44c of the control surface 44 and the inner peripheral surface 31d of the outer ring 31a. Furthermore, an outer diameter of the rolling element 35 is substantially equal to a distance between each intermediate portion 44d and the inner peripheral surface 31d of the outer ring 31a.

The support member 36 is made of a resin material and includes a ring plate 45 and three roller supports 46. Each roller support 46 extends in the axial direction from the ring plate 45 and rotatably supports the corresponding rolling element 35 in substantially parallel with the corresponding control surface 44 of the driven-side rotator 34. The roller supports 46 are circumferentially arranged at substantially equal angular intervals on the ring plate 45.

Each roller support 46 includes a couple of retaining pillars 46a and a connector 46b. The retaining pillars 46a extend in the axial direction from the ring plate 45, and the connector 46b connects distal ends of the retaining pillars 46a together. In the roller support 46, a distance between the retaining pillars 46a is slightly longer than a diameter of the rolling element 35, and a distance between the ring plate 45 and the connector 46b is slightly longer than an axial length of the rolling element 35. The rolling element 35 is rotatably supported between the two retaining pillars 46a and also between the ring plate 45 and the connector 46b. Furthermore, the rolling element 35 is immovable in the circumferential direction of the ring plate 45 but is moveable in the radial direction of the ring plate 45.

In this embodiment, geometrical arrangements of the above-described components 35, 38, 43 and 46 are as follows. That is, as shown in FIG. 7, when the one side surface 38b of each protrusion 38 engages the first engaging surface 43b of the corresponding engaging projection 43, and the first side surface 42a of each opening 42 engages the corresponding roller support 46, the corresponding rolling element 35 is positioned in the center portion 44a of the control surface 44.

Furthermore, when the other side surface 38c of each protrusion 38 engages the second engaging surface 43d of the corresponding engaging projection 43, and the second side surface 42b of each opening 42 engages the corresponding roller support 46, the corresponding rolling element 35 is positioned in the center portion 44a of the control surface 44.

The cover plate 37 is a resin annular plate and is received within the outer ring 31a of the clutch housing 31 in such a manner that the cover plate 37 is slidably engaged with ring plate 45.

A predetermined amount of misalignment (radial displacement and difference in a tilt angle) between the rotational axis of the rotatable shaft 6 and the rotational axis of the worm shaft 23 is permitted in the clutch C because of a small space defined between the outer peripheral surface of the driving-side rotator 32 (protrusions 38) and the inner peripheral surface 31d of the cylindrical outer ring 31a of the clutch housing 31, a space 52 defined between the shaft portion 32a of the driving-side rotator 32 and the cover 31b, and the engagement of the driving-side rotator 32 with the driven-side rotator 34 via the ball 33 protruding from the driving-side rotator 34.

As shown in FIG. 5, a sensor magnet 51 that constitutes the rotational sensor S in cooperation with the Hall ICs 15 is secured to the shaft portion 32a of the driving-side rotator 32. Specifically, the sensor magnet 51 of the present embodiment is annular and is secured around the shaft portion 32a by a thermocompression technique. An outer diameter of the sensor magnet 51 is larger than an inner diameter of the cover 31b of the clutch housing 31. That is, the sensor magnet 51 is formed as the annular disk body having an outer diameter larger than that of the annular space 52 defined between the cover 31b and the shaft portion 32a and is secured around the shaft portion 32a such that the sensor magnet 51 covers the annular space 52.

Each Hall IC 15 is axially aligned with and opposes a portion of an outer peripheral edge of the sensor magnet 51 such that the Hall IC 15 generates a pulse signal corresponding with a rotational speed of the sensor magnet 51 or a rotational speed of the rotatable shaft 6 and outputs it to the control device. When a pulse width of the pulse signal generated during the forward rotation of the rotatable shaft 6 (i.e., when the vehicle window is moved upward) changes at a predetermined rate, the control device stops the power supply to the brushes 10 or reverses a direction of the electric current to stop the vehicle window or moves the vehicle window downward to prevent clamping of an obstruction (such as a human body), for example, between the vehicle window and its window frame.

The power window system (motor 1) having the above-described construction operates as follows.

When the motor main body 2 is driven to rotate the rotatable shaft 6 in the counter-clockwise direction (the direction of the arrow X) in FIG. 6, the driving-side rotator 32 is rotated integrally with the rotatable shaft 6 in the same direction (the direction of the arrow X). Then, as shown in FIG. 7, when the one side surface 38b of each protrusion 38 engages the first engaging surface 43b of the corresponding engaging projection 43, and the first side surface 42a of each opening 42 engages the corresponding roller support 46, the corresponding rolling element 35 is positioned in the center portion 44a of the corresponding control surface 44 (this position is hereinafter called a "neutral position").

Prior to the engagement of the one side surface 38b of the protrusion 38 with the first engaging surface 43b, the one side surface 39d of the corresponding cushion segment 39b engages the first cushion surface 43a of the corresponding engaging projection 43 to reduce the shocks generated by the engagement.

At the neutral position, the rolling element 35 is not clamped between the control surface 44 of the engaging projection 43 and the inner peripheral surface 31d of the outer ring 31a, so that the driven-side rotator 34 is allowed to rotate relative to the clutch housing 31. Thus, when the driving-side rotator 32 is further rotated in the counter-clockwise direction, the rotational force of the driving-side rotator 32 is transmitted to the driven-side rotator 34 via the protrusions 38, so that the driven-side rotator 34 is rotated along with the driving-side rotator 32. During this stage, the rotational force is transmitted to each rolling element 35 from the first side surface 42a of the corresponding opening 42 in the same direction (the direction of the arrow X), so that the rolling element 35 moves in the same direction.

Alternatively, when the rotatable shaft 6 is rotated in the clockwise direction (the direction of the arrow Y) in FIG. 6, each rolling element 35 is positioned in the neutral position by the protrusion 38. At this position, the rolling element 35 is not clamped between the control surface 44 of the engaging projection 43 and the inner peripheral surface 31d of the outer ring 31a, so that the driven-side rotator 34 is allowed to rotate relative to the clutch housing 31. Thus, the rotational force of the driving-side rotator 32 is transmitted to the driven-side rotator 34 through the protrusions 38, so that the driven-side rotator 34 is rotated along with the driving-side rotator 32.

Thus, the rotation of the driven-side rotator 34 causes the worm shaft 23 to be rotated, and thereby rotating the worm wheel 24 and the output shaft 25. Thus, the vehicle window connected to the output shaft 25 is moved downward or upward.

Figure 8:
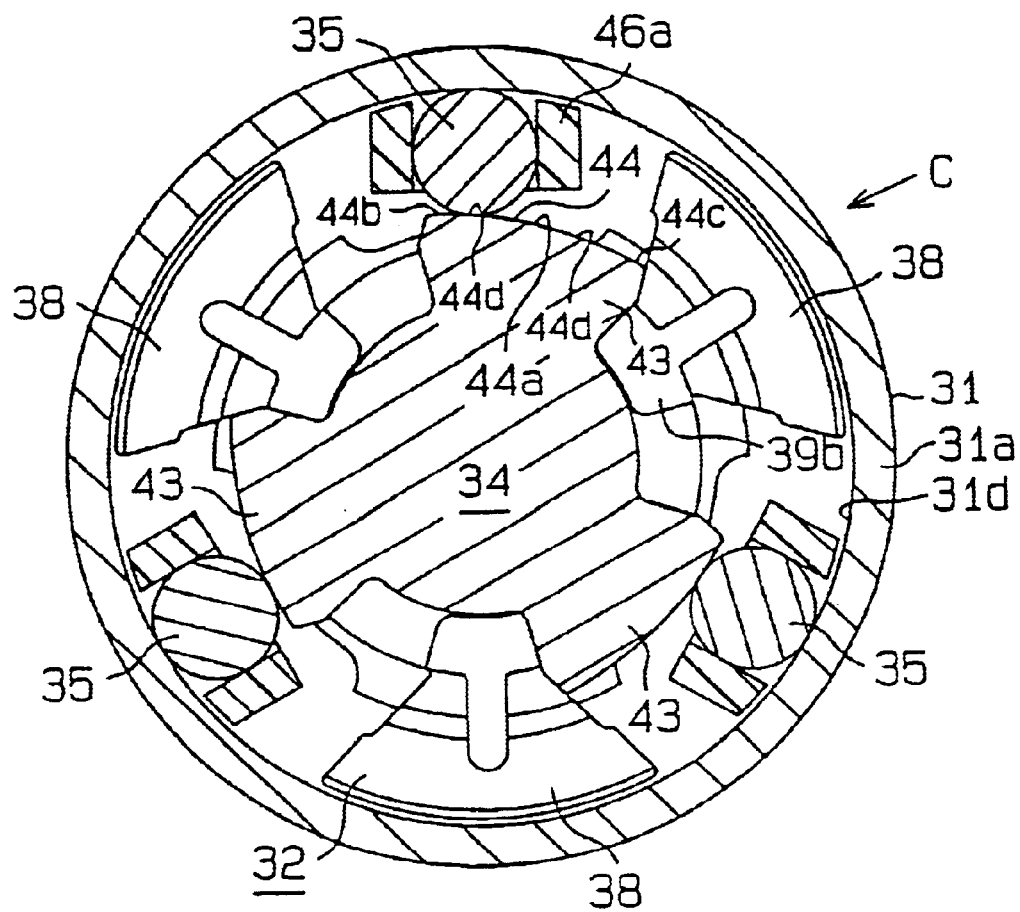
FIG. 8 is another descriptive cross-sectional view of the clutch according to the embodiment, showing another operational state of the clutch.

When the motor 1 is not energized, a load applied to the output shaft 25 causes the driven-side rotator 34 to rotate. When the driven-side rotator 34 is rotated in the clockwise direction (the direction of the arrow Y) in FIG. 6, each rolling element 35 is moved toward the end portion 44b (toward the intermediate portion 44d) of the control surface 44 of the engaging projection 43. Then, as shown in FIG. 8, when the rolling element 35 reaches the intermediate portion 44d, the rolling element 35 is clamed between the control surface 44 and the inner peripheral surface 31d of the outer ring 31a (locked state). Since the outer ring 31a is secured, the driven-side rotator 34 cannot be rotated further, so that the driving-side rotator 32 cannot be rotated by the driven-side rotator 32.

When the driven-side rotator 34 is rotated in the counter-clockwise direction (the direction of the arrow X) in FIG. 6, the driving-side rotator 32 stays still. Thus, each rolling element 35 is moved toward the end portion 44c (toward the intermediate portion 44d) of the control surface 44 of the corresponding engaging projection 43. Then, when the rolling element 35 reaches the intermediate portion 44d, the rolling element 35 is clamped between the control surface 44 and the inner peripheral surface 31d of the outer ring 31a (locked state). Since the outer ring 31a is secured, the driven-side rotator 34 cannot be rotated further, so that the driving-side rotator 32 cannot be rotated by the driven-side rotator 34.

As described above, even if a large load is applied to the output shaft 25, the rotation of the driven-side rotator 34 is prevented. Thus, the vehicle window that is connected to the output shaft 25 is effectively prevented from moving upward and downward by its own weight or an external force.

The rotational speed of the rotatable shaft 6 is measured with the rotational sensor S (Hall ICs 15), and a measured signal (pulse signal) of the rotational sensor S (Hall ICs 15) is outputted to the control device.

When the obstruction is clamped, for example, between the vehicle window and its window frame during the upward movement of the vehicle window, and thus the rotational speed of the rotatable shaft 6 changes at the predetermined rate, the driving electric current is controlled by the control device, so that the travel of the window is stopped or is reversed to prevent further upward movement of the window. Thus, the clamping load applied on the clamped obstruction does not increase further.

Characteristic advantages of the above-described embodiment will be described below.

(1) The sensor magnet 51 is secured to the shaft portion 32a of the driving-side rotator 32 which is connected to the rotatable shaft 6 to rotate integrally therewith. Thus, it is not required to provide a sensor magnet securing region on the rotatable shaft 6 for accommodating the sensor magnet 51, so that the length of the rotatable shaft 6 can be shortened. That is, the axial length along which the driving-side rotator 32 is interfitted with the rotatable shaft 6 is partially overlapped with the axial length of the sensor magnet 51, so that the required axial length of the motor 1 can be advantageously reduced. As a result, the size of the motor 1 having the clutch C and the rotational sensor S can be reduced or minimized.

(2) The sensor magnet 51 that is secured around the shaft portion 32a is formed as the annular disk body having the outer diameter larger than that of the annular space 52 defined between the cover 31b and the shaft portion 32a, so that the sensor magnet 51 covers the entire annular space 52. Thus, intrusion of small particles, such as small debris of the brushes 10 generated by the friction between the brushes 10 and the commutator 8, into the interior of the clutch C is well limited. As a result, normal operation of the clutch C can be maintained for a much longer period of time.

(3) The Hall ICs 15 are mounted on the circuit board 17 that is secured to the second side of the holder main body 9a, i.e., the opposite side of the holder main body 9a with respect to the brushes 10, so that the small debris of the brushes 10 will not easily come into contact with the Hall ICs 15. Thus, the erroneous measurements of the Hall ICs 15 caused by the small debris of the brushes 10 adhered to the Hall ICs 15 are effectively reduced. Furthermore, since the small debris of the brushes 10 will not easily come into contact with the circuit board 17, the short circuits due to the adhesion of the small debris will less likely to occur at the soldered points on the circuit board 17.

(4) The clutch C permits the misalignment between the rotational axis of the rotatable shaft 6 and the rotational axis of the worm shaft 23. Thus, even if the misalignment between the rotational axis of the rotatable shaft 6 and the rotational axis of the worm shaft 23 is produced during assembling of the motor 1, noise and vibrations due to the misalignment are advantageously minimized, and loss of the driving force is also advantageously restrained.

The above embodiment can be modified as follows.

In the above embodiment, the sensor magnet 51 is constructed such that the sensor magnet 51 covers the annular space 52 communicated with the interior of the clutch C. Alternatively, the sensor magnet 51 can be constructed such that the sensor magnet 51 does not cover the annular space 52. Even with this arrangement, it is possible to accomplish the advantages similar to those described in the above sections (1) and (3).

In the above embodiment, the Hall ICs 15 are secured to the circuit board 17 that is, in turn, secured to the brush holder 9. However, the Hall ICs 15 can be secured to any other point where the Hall ICs 15 can be arranged to face the sensor magnet 15. For instance, the Hall ICs 15 can be secured to the gear housing 21. Even with this arrangement, it is possible to accomplish the advantages similar to those described in the above sections (1) and (2).

In the above embodiment, the two Hall ICs 15 are provided. Alternatively, one Hall IC or more than two Hall ICs can be provided.

The Hall ICs 15 in the above embodiment can be replaced with any other appropriate sensing element(s) as long as it can measure a magnetic flux of the sensor magnet 51.

The clutch C of the above embodiment can be replaced with any other coupling member as long as it can couple the rotatable shaft 6 with the worm shaft 23 in such a manner that the coupling member transmits the rotation of the rotatable shaft 6 to the worm shaft 23 and prevents the transmission of the rotation of the worm shaft 23 to the rotatable shaft 6. For example, the clutch C can be replaced with other type of clutch that does not substantially permit the misalignment between the rotational axis of the rotatable shaft 6 and the rotational axis of the worm shaft 23. Even with this arrangement, it is possible to accomplish the advantages similar to those described in the above sections (1)–(3).

In the above embodiment, the clutch C is used as the coupling member for coupling the rotatable shaft 6 with the worm shaft 23. However, the clutch C can be replaced with other type of coupling member that includes a driving-side rotator, which is connected to the rotatable shaft 6 to integrally rotate therewith, and a driven-side rotator, which is connected to the worm shaft 23 to integrally rotate therewith and is drivingly engageable with the driving-side rotator while permitting the misalignment between the rotational axis of the rotatable shaft 6 and the rotational axis of the worm shaft 23. In other words, the clutch C can be replaced with other type of coupling member that does not prevent the transmission of the rotation of the worm shaft 23 to the rotatable shaft 6 and also permits the misalignment between the rotational axis of the rotatable shaft 6 and the rotational axis of the worm shaft 23. Even with this arrangement, it is possible to reduce the size of the motor 1 that includes the rotational sensor S and the coupling member that permits the misalignment between the rotational axis of the rotatable shaft 6 and the rotational axis of the worm shaft 23. Furthermore, the other type of coupling member may have a resilient element, such as a rubber element, arranged between the driving-side rotator and the driven-side rotator to couple the driving-side rotator with the driven-side rotator. With this arrangement, it is possible to reduce shocks that are generated between the driving-side rotator and the driven-side rotator when the motor is locked, and also it is possible to reduce noise generated between the driving-side rotator and the driven-side rotator during rotation of these rotators.

In the above embodiment, the present invention is embodied in the motor 1 of the power window system. However, the present invention can be embodied in any other type of device.

Additional advantages and modifications will readily occur to those skilled in the art. The invention in its broader terms is therefore, not limited to the specific details, representative apparatus, and illustrative examples shown and described.

What is claimed is:

1. A motor comprising:
    a motor case;
    a rotatable shaft that is rotatably supported by said motor case and is rotated upon actuation of said motor;
    a worm shaft that is substantially coaxial with said rotatable shaft and is rotatably supported by said motor case;
    a coupling member including a driving-side rotator and a driven-side rotator that is drivingly engageable with said driving-side rotator, said driving-side rotator being connected to said rotatable shaft to rotate integrally therewith, said driven-side rotator being connected to said worm shaft to rotate integrally therewith; and
    a rotational sensor that includes a sensor magnet and a sensing element, said sensor magnet rotating integrally with said rotatable shaft, said sensing element measuring a rotational speed of said sensor magnet, wherein:
        said sensor magnet is secured to said driving-side rotator to rotate integrally therewith;
        said sensing element is secured to said motor case in such a manner that said sensing element opposes said sensor magnet; and
        said coupling member transmits rotation of said rotatable shaft to said worm shaft and prevents transmission of rotation of said worm shaft to said rotatable shaft.

2. A motor according to claim 1, wherein said sensor magnet is arranged to cover a space that is defined in said coupling member and that is communicated with an interior of said coupling member.

3. A motor according to claim 2, wherein:
    said coupling member further includes a housing that circumferentially surrounds said driving-side rotator and said driven-side rotator;
    said driving-side rotator includes a shaft portion that protrudes out of said housing of said coupling member, said shaft portion including an interfitting recess with which said rotatable shaft is interfitted;

said space is annular and is defined between said housing of said coupling member and said shaft portion; and said sensor magnet is annular-disk shaped and has an outer diameter that is greater than an outer diameter of said space such that said sensor magnet covers said space.

4. A motor according to claim 1, wherein:

said motor case includes a cup-shaped yoke and a housing, said cup-shaped yoke having an open end and receiving said rotatable shaft, said housing of said motor case receiving said worm shaft and being secured to said open end of said yoke;

said open end of said yoke has a brush holder secured therein; and said sensing element is secured on a circuit board that is, in turn, secured to said brush holder.

5. A motor according to claim 1, wherein said sensing element is a Hall IC.

6. A motor according to claim 1, wherein:

said driving-side rotator includes:

a shaft portion, which receives said rotatable shaft in such a manner that said shaft portion rotates integrally with said rotatable shaft; and a disk body, which has an outer diameter larger than an outer diameter of said shaft portion; and said driving-side rotator transmits rotation of said rotatable shaft to said driven-side rotator through said shaft portion and said disk body.

7. A motor according to claim 6, wherein said sensor magnet is secured to said shaft portion of said driving-side rotator.

8. A motor according to claim 1, wherein said driving-side rotator is made of a resin material.

9. A motor according to claim 8, wherein said sensor magnet is secured to said driving-side rotator using a thermocompression technique.

10. A motor according to claim 1, wherein:

said motor case includes a cup-shaped yoke and a housing, said cup-shaped yoke having an open end and receiving said rotatable shaft, said housing of said motor case receiving said worm shaft and being secured to said open end of said yoke;

said open end of said yoke has a brush holder secured therein, said brush holder holding a power supplying brush on a first axial side of said brush holder which faces an interior of said yoke; and said sensing element is secured to a second axial side of said brush holder that is opposite to said first axial side of said brush holder.

11. A motor according to claim 10, wherein said sensing element is secured on a circuit board that is, in turn, secured to said second axial side of said brush holder.

12. A motor according to claim 1, wherein said coupling member permits misalignment between a rotational axis of said rotatable shaft and a rotational axis of said worm shaft.

13. A motor according to claim 12, wherein said coupling member permits a predetermined amount of radial displacement and a predetermined amount of difference in a tilt angle between said rotational axis of said rotatable shaft and said rotational axis of said worm shaft.

14. A motor comprising:

a motor case;

a rotatable shaft rotatably supported by said motor case and rotated upon motor actuation;

a worm shaft substantially coaxial with said rotatable shaft and rotatably supported by said motor case; and a coupling member including a driving-side rotator and a driven-side rotator that is drivingly engageable with said driving-side rotator, said driving-side rotator being connected to said rotatable shaft to rotate integrally therewith, said driven-side rotator being connected to said worm shaft to rotate integrally therewith, said coupling member for transmitting rotation of said rotatable shaft to said worm shaft and for preventing transmission of rotation of said worm shaft to said rotatable shaft.

15. A motor comprising:

a motor case;

a rotatable shaft rotatably supported by said motor case and rotated upon motor actuation;

a worm shaft substantially coaxial with said rotatable shaft and rotatably supported by said motor case; and a coupling member including a driving-side rotator and a driven-side rotator that is drivingly engageable with said driving-side rotator, said driving-side rotator being connected to said rotatable shaft to rotate integrally therewith, said driven-side rotator being connected to said worm shaft to rotate integrally therewith, said coupling member for permitting misalignment between a rotational axis of said rotatable shaft and a rotational axis of said worm shaft.

16. A motor comprising:

a motor case;

a rotatable shaft that is rotatably supported by said motor case and is rotated upon actuation of said motor;

a worm shaft that is substantially coaxial with said rotatable shaft and is rotatably supported by said motor case;

a coupling member including a driving-side rotator and a driven-side rotator that is drivingly engageable with said driving-side rotator, said driving-side rotator being connected to said rotatable shaft to rotate integrally therewith, said driven-side rotator being connected to said worm shaft to rotate integrally therewith; and a rotational sensor that includes a sensor magnet and a sensing element, said sensor magnet rotating integrally with said rotatable shaft, said sensing element measuring a rotational speed of said sensor magnet, wherein:

said sensor magnet is secured to said driving-side rotator to rotate integrally therewith;

said sensing element is secured to said motor case in such a manner that said sensing element opposes said sensor magnet; and said coupling member permits misalignment between a rotational axis of said rotatable shaft and a rotational axis of said worm shaft.

17. A motor according to claim 16, wherein said coupling member permits a predetermined amount of radial displacement and a predetermined amount of difference in a tilt angle between said rotational axis of said rotatable shaft and said rotational axis of said worm shaft.

18. A motor comprising:

a motor case;

a rotatable shaft that is rotatably supported by said motor case and is rotated upon actuation of said motor;

a worm shaft that is substantially coaxial with said rotatable shaft and is rotatably supported by said motor case;

a coupling member including a driving-side rotator and a driven-side rotator that is drivingly engageable with said driving-side rotator, said driving-side rotator being connected to said rotatable shaft to rotate integrally therewith, said driven-side rotator being connected to said worm shaft to rotate integrally therewith; and a rotational sensor that includes a sensor magnet and a sensing element, said sensor magnet rotating integrally with said rotatable shaft, said sensing element measuring a rotational speed of said sensor magnet, wherein:
said sensor magnet is secured to said driving-side rotator to rotate integrally therewith;
said sensing element is secured to said motor case in such a manner that said sensing element opposes said sensor magnet; and
said sensor magnet is arranged to cover a space that is defined in said coupling member and that is communicated with an interior of said coupling member.

19. A motor comprising:

a cup-shaped yoke that has an open end;

a rotatable shaft that is rotatably supported in said yoke and is rotated upon actuation of said motor;

a housing that is secured to said open end of said yoke;

a worm shaft that is separated from said rotatable shaft and is substantially coaxial with said rotatable shaft, said worm shaft being rotatably supported in said housing;

a coupling member including a driving-side rotator and a driven-side rotator that is drivingly engageable with said driving-side rotator, said driving-side rotator being connected to said rotatable shaft to rotate integrally therewith, said driven-side rotator being connected to said worm shaft to rotate integrally therewith;

a brush holder that is secured in said open end of said yoke and holds a power supplying brush on a first axial side of said brush holder which faces an interior of said yoke; and a rotational sensor that includes a sensor magnet and a sensing element, said sensor magnet rotating integrally with said rotatable shaft, said sensing element measuring a rotational speed of said sensor magnet, wherein said sensing element is secured to a second axial side of said brush holder, which is opposite to said first axial side of said brush holder, in such a manner that said sensing element opposes said sensor magnet.

20. A motor according to claim 19, wherein said sensing element is secured on a circuit board that is, in turn, secured to said second axial side of said brush holder.

21. A motor according to claim 19, wherein said sensor magnet is secured to said driving-side rotator to rotate integrally therewith.

* * * * *